US011874882B2

(12) United States Patent
Xiong et al.

(10) Patent No.: US 11,874,882 B2
(45) Date of Patent: Jan. 16, 2024

(54) EXTRACTING KEY PHRASE CANDIDATES FROM DOCUMENTS AND PRODUCING TOPICAL AUTHORITY RANKING

(71) Applicant: Microsoft Technology Licensing, LLC, Redmond, WA (US)

(72) Inventors: Li Xiong, Kirkland, WA (US); Chuan Hu, Redmond, WA (US); Arnold Overwijk, Redmond, WA (US); Junaid Ahmed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 719 days.

(21) Appl. No.: 16/460,776

(22) Filed: Jul. 2, 2019

(65) Prior Publication Data

US 2021/0004416 A1    Jan. 7, 2021

(51) Int. Cl.
*G06F 16/951* (2019.01)
*G06F 16/906* (2019.01)
*G06F 16/955* (2019.01)
*G06F 16/9536* (2019.01)
*G06F 40/289* (2020.01)

(52) U.S. Cl.
CPC .......... *G06F 16/951* (2019.01); *G06F 16/906* (2019.01); *G06F 16/955* (2019.01); *G06F 16/9536* (2019.01); *G06F 40/289* (2020.01)

(58) Field of Classification Search
CPC .... G06F 16/951; G06F 16/906; G06F 16/955; G06F 16/9536; G06F 40/289; G06F 16/35
See application file for complete search history.

(56) References Cited

U.S. PATENT DOCUMENTS

| 8,972,404 B1* | 3/2015 | Lewis ................... G06F 16/35 707/737 |
| 2002/0022956 A1* | 2/2002 | Ukrainczyk ........... G06F 40/20 707/E17.084 |
| 2002/0156653 A1 | 10/2002 | Florio et al. |
| 2005/0165753 A1* | 7/2005 | Chen .................. G06F 16/9535 |

(Continued)

OTHER PUBLICATIONS

Thruesen, Philip, et al. "To link or not to link: Ranking hyperlinks in Wikipedia using collective attention." 2016 IEEE International Conference on Big Data (Big Data). IEEE, 2016. (Year: 2016).*

(Continued)

*Primary Examiner* — Marc S Somers
(74) *Attorney, Agent, or Firm* — Calfee, Halter & Griswold LLP (57) ABSTRACT

A system for extracting key phrase candidates from a corpus of documents, including a processor, a memory, and a program executing on the processor. The system is configured to run a key phrase model to extract one or more key phrase candidates from each document in the corpus and convert each extracted key phrase candidate into a feature vector. The key phrase model also filters the feature vectors to remove duplicates using a classifier that was trained on a set of key phrase pairs with manual labels indicating whether two key phrases are duplicates of each other, to produce remaining key phrase candidates. The system uses the remaining key phrase candidates in a computer-implemented application.

20 Claims, 5 Drawing Sheets

(56) References Cited

U.S. PATENT DOCUMENTS

| | | | |
|---|---|---|---|
| 2011/0307468 A1 | 12/2011 | Duan et al. | |
| 2012/0117092 A1* | 5/2012 | Stankiewicz | G06F 16/3329 707/755 |
| 2013/0110498 A1* | 5/2013 | Bekkerman | G06F 40/289 704/9 |
| 2013/0346386 A1* | 12/2013 | Zandona | G06F 16/951 707/709 |
| 2014/0074816 A1* | 3/2014 | Banerjee | G06F 16/9535 707/750 |
| 2016/0125087 A1 | 5/2016 | Mallah et al. | |
| 2017/0046311 A1 | 2/2017 | Walker | |
| 2017/0124432 A1 | 5/2017 | Chen et al. | |
| 2017/0150235 A1 | 5/2017 | Mei et al. | |
| 2017/0235835 A1 | 8/2017 | Wang et al. | |
| 2017/0235836 A1 | 8/2017 | Wang et al. | |
| 2017/0316519 A1 | 11/2017 | Wang et al. | |
| 2018/0060423 A1 | 3/2018 | Zheng et al. | |
| 2018/0089541 A1 | 3/2018 | Stoop et al. | |
| 2018/0089542 A1 | 3/2018 | Stoop et al. | |
| 2018/0165554 A1 | 6/2018 | Zhang et al. | |
| 2018/0196800 A1 | 7/2018 | Volkovs et al. | |
| 2018/0267996 A1 | 9/2018 | Lin et al. | |
| 2018/0267997 A1 | 9/2018 | Lin et al. | |
| 2019/0130312 A1 | 5/2019 | Xiong et al. | |
| 2020/0110930 A1 | 4/2020 | Simantov et al. | |
| 2020/0151448 A1 | 5/2020 | Lin et al. | |
| 2020/0311468 A1 | 10/2020 | Kim et al. | |
| 2021/0004439 A1 | 1/2021 | Xiong et al. | |
| 2022/0108078 A1 | 4/2022 | Xiong et al. | |

OTHER PUBLICATIONS

Yates, Elliot J., and Louise C. Dixon. "PageRank as a method to rank biomedical literature by importance." Source code for biology and medicine 10.1 (2015): 1-9. (Year: 2015).*

Hu, et al., "Automatic Extraction of Titles from General Documents Using Machine Learning", In Journal of Information Processing and Management, Elsevier, vol. 42, No. 5, Sep. 1, 2006, pp. 1276-1293.

Jiang, et al., "A Ranking Approach to Keyphrase Extraction", In Proceedings of the ACM 32nd International ACM SIGIR Conference on Research and development in information retrieval, Jul. 19, 2009, pp. 756-757.

"International Search Report and Written Opinion Issued in PCT Application No. PCT/US20/036535", dated Sep. 7, 2020, 12 Pages.

"International Search Report and Written Opinion Issued in PCT Application No. PCT/US20/036537", dated Sep. 9, 2020, 10 Pages.

Sarkar, et al., "Machine Learning Based Keyphrase Extraction: Comparing Decision Trees, Naïve Bayes, and Artificial Neural Networks", In Journal of The Journal of Information Processing Systems (JIPS), vol. 8, No. 4, Dec. 1, 2012, pp. 693-712.

Yao, et al., "A Feature Selection Method Based on Synonym Merging in Text Classification System", In EURASIP Journal on Wireless Communications and Networking, vol. 2017, No. 1, Oct. 5, 2017, pp. 1-8.

"Non Final Office Action Issued in U.S. Appl. No. 16/460,853", dated Apr. 12, 2021, 7 Pages.

"Notice of Allowance Issued in U.S. Appl. No. 17/552,742", dated Jan. 17, 2023, 9 Pages.

* cited by examiner

EXTRACTING KEY PHRASE CANDIDATES FROM DOCUMENTS AND PRODUCING TOPICAL AUTHORITY RANKING

BACKGROUND

Topical authority is the perceived authority of a website for a given topic. "Authority" may include such factors as the quality and relevance of a given website to a particular topic, how reputable the website is, the depth and breadth of expertise or knowledge presented on the website, its direct connection to the subject matter, and the like. Calculating the topical authority of webpages and websites has drawn much attention since the advent of the World Wide Web (WWW). Graph-based approaches operate by structuring a network as a graph, with nodes on the graph being webpages or websites or others depending on how the graph is designed. With such methods, each node on a graph produces a single ranking score, also referred to as a "global" ranking. Some existing techniques calculate a single ranking score for each node in a network without using the content of the nodes.

Conventional approaches to producing topical authority of websites or documents have significant drawbacks, which is particularly concerning at a time when topical authority is becoming increasingly important to counter disinformation and spam in search engine results, newsfeeds, and the like. A web search engine can search billions of indexed pages in a given corpus. Existing approaches aren't designed to provide topical authority ranking at internet or web scale, due to a number of limitations. For example, the fact that there may be billions of pages in a given corpus, covering a great many topics and subtopics, introduces technical challenges to extracting accurate topics in an efficient manner. Conventional systems are constrained to a fixed set of topics or sites and therefore cannot adequately handle the problem of new pages and sites appearing on the internet every day. Furthermore, global ranking of a site does not reflect enough resolution to its authority with regard to granular or specific topics, e.g., "tax" or "space station."

It is with respect to these and other general considerations that embodiments have been described. Although relatively specific problems are discussed herein, it should be understood that the embodiments should not be limited to solving the specific problems identified in the background.

BRIEF SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

One embodiment is a system for extracting key phrase candidates from a corpus of documents. It is noted that the key phrase candidates can be topic candidates, and a document can include a web page of a website.

The system is configured to run a key phrase model to extract one or more key phrase candidates from each document in the corpus and convert each extracted key phrase candidate into a feature vector. The key phrase model incorporates machine learning to filter the feature vectors to remove duplicates using a model or classifier, such as a binary classifier, that was trained on a set of key phrase pairs with manual labels indicating whether two key phrases are duplicates of each other, to produce remaining key phrase candidates. The system can use the remaining key phrase candidates in a computer-implemented application.

One computer-implemented application may be a model to create a site topic purity factor $T(s,t)$ of a website s, and run an aggregation and ranking model to use the site topic purity factor $T(s,t)$ to compute an authority score $A(s,t)$ of website s given topic t.

BRIEF DESCRIPTION OF THE FIGURES (NON-LIMITING EMBODIMENTS OF THE DISCLOSURE)

Various embodiments in accordance with the present disclosure will be described with reference to the drawings, in which.

DETAILED DESCRIPTION

In the following detailed description, reference is made to the accompanying drawings which form a part hereof, and in which are shown by way of illustration specific embodiments. These embodiments are described in sufficient detail to enable those of ordinary skill in the art to practice the technology, and it is to be understood that other embodiments may be utilized and that structural, logical, and electrical changes may be made without departing from the spirit and scope of the disclosure. The following detailed description is therefore not to be taken in a limiting sense, and the scope is defined only by the appended claims and equivalents thereof. Like numbers in the figures refer to like components, which should be apparent from the context of use.

Embodiments include technologies for extracting key phrase candidates from a corpus of documents, and also include technologies for producing topical authority ranking of webpages, documents, or sites in a given corpus to thereby enable a search engine to systematically determine the webpages, documents, or sites that are more authoritative, or less authoritative, in the corpus. It is noted that in this application the term "sites" may include websites (such as nasa.gov), social media sites, or others. Topical authority ranking of documents or webpages may thus be done at web or internet scale. The notion of perceived authority is closely connected to topics. Consider as an example several sites for the topic "baseball hall of fame." At one end of the spectrum there is baseballhall.org that is perhaps the most authoritative site for "baseball hall of fame." At the other end of the spectrum there are sites such as mayoclinic.org which are authoritative in other topics (here, topics related to health) but irrelevant to "baseball hall of fame." Somewhere in between, there are sites that cover the "baseball hall of fame" topic with reasonable quality, such as wikipedia.org.

An aspect of this disclosure includes finding the site level (i.e., domain, host level) topical authority as per Definition 1 below. It is noted that working at site level as opposed to webpage level can reduce the damage from model errors introduced by any single page.

Definition 1. Topical authority A(s,t) measures the authority score of site s given topic t.

For the "baseball hall of fame" example, an ideal topical authority model should rank:

A(baseballhall.org, baseball hall of fame)>A(wikipedia.org, baseball hall of fame)

A(wikipedia.org, baseball hall of fame)>A(mayoclinic.org, baseball hall of fame)

Embodiments comprise a general model that computes A(s,t) such that A(s,t) aligns with the perceived authoritativeness on any given topic among all relevant sites. By virtue of the features of the system described herein, search engine quality can be improved, and in particular the trustworthiness of web search results, for example, can be improved.

The techniques described herein are useful and can be implemented in a number of applications. For example, topical authority can be utilized for ordering and presenting the results of search engines, or for the process where a series of text snippets are displayed in relation to search terms, each text snippet followed by a link to the source. The techniques described herein can also be used for supplying by a search engine personalized news and blogs (for example on a mobile app) in the form of an "infinite" scroll down. The system of the present disclosure can identify with greater confidence high quality articles or documents from top authoritative sites.

Another application of topical authority is a question and answering service. Today, major search engines can often provide a short, synthesized answer to a common question query. Search users often prefer answers extracted from more authoritative sources over content farm sites or community curated sites. The topical authority of embodiments helps promote sites with high perceived authoritativeness according to the authority score of site s given topic t, as per Definition 1 above. The techniques of the present disclosure can improve upon precision metrics.

Figure 1:
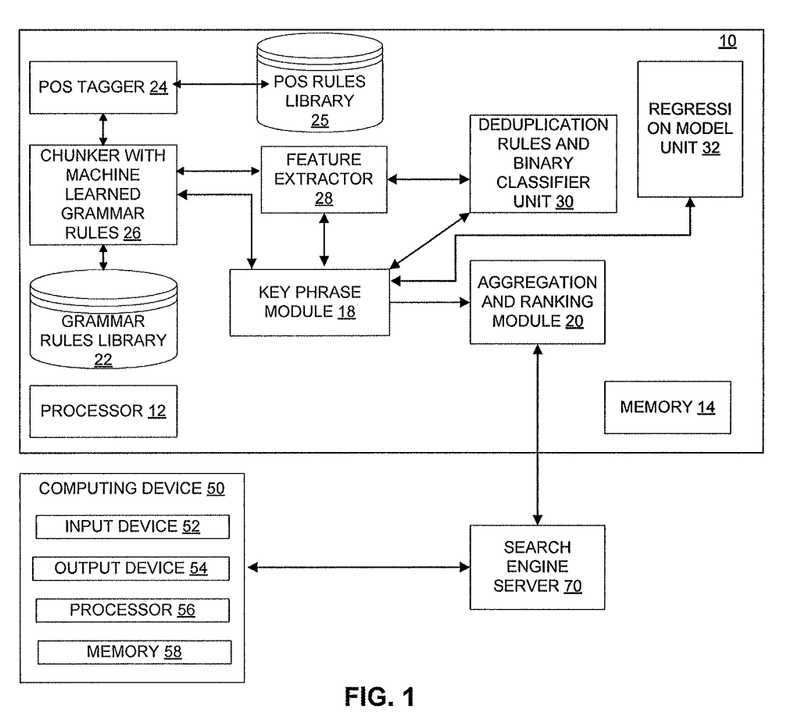
FIG. 1 shows a schematic representation of a system for producing topical authority ranking according to an exemplary embodiment of the present disclosure.

FIG. 1 shows a schematic representation of a system for producing topical authority ranking according to an embodiment of the present disclosure. The system includes a topical authority ranking (TAR) server or platform 10 that outputs a signal to a search engine server 70. Embodiments of the TAR platform 10 can instead be incorporated into a search engine server via hardware or software or a combination thereof. The search engine server 70 can be for example a web search engine server or a search engine server for searching an internal network or an intranet.

The search engine server 70 communicates with a computing device 50. The computing device 50 can be a user device requesting search results and includes an input device 52 and an output device 54. The input device 52 allows a user to input data through text, speech, audio, or video and may include one or more of a microphone, a keyboard, a camera, and a touchscreen (not shown). The output device 54 may include one or more of a display and a speaker (not shown). The computing device 50 also includes a processor 56 and a memory 58 and may be, for example, a laptop computer, a smartphone, a tablet, a desktop computer, a headless device, or others.

The TAR platform 10 has a processor 12 and a memory 14 and executes a key phrase module 18 and an aggregation and ranking module 20.

As an overview, the key phrase module 18 extracts one or more key phrase candidates, each of which are then converted into a feature vector. A classifier then filters the feature vectors to remove duplicates. The classifier is trained on a set of key phrase pairs with manual labels indicating whether two key phrases are duplicates of each other, to produce remaining key phrase candidates. Accordingly, those key phrase candidates that are not subsequently filtered out become topic candidates or topics. Thus, the key phrase module 18 produces topics (core concepts) from web pages or documents using machine learning.

In more detail, FIG. 1 includes a chunker 26 that generates key phrase candidates using grammar rules. Grammar rules are a set of human predefined sequence patterns that are used to generate key phrase candidates. In the embodiment of FIG. 1 the chunker uses a grammar rules library 22 that defines and/or stores a set of grammar rules for key phrase candidate generation. The grammar rules library 22 can be an external file or database. In an alternative embodiment the set of grammar rules can be embedded in code within the key phrase module 18.

Grammar rules for candidate generation are defined through mining Part-of-Speech (POS) rules on a large set of user queries from a search engine (e.g., a web search engine) using a POS tagger 24. POS tagging is a technique that generates POS tags for each word in the input text. POS encoding is a one-hot encoding that converts POS tags into integer vectors which can be used in machine learning algorithms. The POS tagger 24 can access an external file containing POS rules, or can access a POS rules library 25, or can be embedded in code within the key-phrase module 18. The POS tagger 24 could use open source software but could use closed software as well. In the example shown in FIG. 3 approximately 100 valid grammar rules for candidate generation were defined, e.g., JJ+NN or VBG+NNP. These are POS tags that represent semantic property of words in sentences and are known in the art. Example tags include adjective, noun, and noun singular. More specifically, as in FIG. 3, JJ=adjective; NN=noun, singular or mass; VBG=verb, gerund, or present participle; NNP=proper noun, singular; VBZ=verb, third person singular present; CD=cardinal number; and IN=preposition or subordinating conjunction.

The POS tagger 24 runs POS tagging for each page over its title and primary content, to generate tagged sequences. The chunker 26 extracts key phrase candidates from each tagged sequence by filtering the sequence with the POS rules defined above. The feature extractor 28 converts each extracted key phrase candidate into a feature vector.

Some of the more prominent features include the following: (1) Language statistics, including Term Frequency (TF) and Inverse Document Frequency (IDF). (2) Ratio of overlap with the page title and page URL, where it is discovered that in general important key phrases better overlap with the title and URL. (3) Relative position on the page, where it is found that useful information often occurs early on in the page. (4) One-hot encoding of the POS tag. (5) Features of surrounding words, including POS encoding and language statistics. (6) Case encoding, e.g., lower case, upper case, or camel case. (7) Stopword features, i.e., whether the candidate starts or ends with stopwords. These and others can be built into the code for the key-phrase module 18.

A deduplication rules and binary classifier unit 30 preferably filters all of the feature vectors by deduplication rules. Then the feature vectors are filtered by a binary classifier. Essentially, "deduplication" is a process of filtering "duplicate" feature vectors. In this application a "duplicate" feature vector may be an extracted key phrase candidate that is identical in text. A "duplicate" feature vector may also include extracted key phrase candidates that are essentially or substantively duplicates of each other even if the two extracted key phrase candidates are not identical in text. For example two extracted feature vectors "The United States" and "US" can be combined into one feature vector "US." This simplifies the analysis.

Examples of deduplication rules that may be used include the following: (1) Combine candidates that have a different case. (2) Combine candidates that are the same entity in full name and abbreviation. (3) Deduplicate candidates that overlap with each other on language statistics. For example, if several candidates overlap then drop the candidates having a Term Frequency-Inverse Document Frequency value (TF-IDF) below a defined threshold. (4) Drop candidates starting or ending with stopwords or containing curse words. Stopwords are common English words which carry minimum semantics, such as "a", "an," and "the." Curse words refer to hostile words that may offend users of a search engine.

The binary classifier portion of the deduplication rules and binary classifier unit 30 uses machine learning and is trained on a collection of key phrase pairs with manual labels. The labels indicate whether two key phrases are duplicates of each other.

In more detail, the binary classifier analyzes the feature vectors, which as explained above are extracted key-phrase candidates that have been converted into feature vectors (and that preferably have undergone deduplication). The binary classifier determines which feature vectors pass and which are filtered out based on the features and based on machine learning to learn how to filter out feature vectors that are duplicates of each other. The manual labels are used to train the binary classifier. Key-phrase pairs are provided to the binary classifier with labels showing examples of key-phrase pairs that are duplicates of each other. One way to do this is by using the LambdaMart algorithm. LambdaMart is a machine learning algorithm for this prediction task. After the binary classifier using the LambdaMart algorithm is trained on these labels, the binary classifier can predict whether a pair of feature vectors are duplicates.

The deduplication rules and binary classifier unit 30 then calculates TextRank among the remaining feature vectors. TextRank performs a PageRank-like computation among all feature vectors, in which each feature vector is a node on a graph and each pair of feature vectors are connected by an edge. The edge weight is the sum of the distance similarity between two feature vectors and the word embedding similarity calculated from FastText. The deduplication rules and binary classifier unit 30 uses TextRank to assign a score to each feature vector, the score representing the relative importance of that particular feature vector in the input text, e.g., in the document or webpage. This score is used in the final scoring model.

A regression model unit 32 scores the filtered feature vectors by a regression model, yielding a final list of topics for each page. One example of a suitable regression model is LambdaMart. LambdaMart is an efficient implementation of the gradient boost tree. This scoring model is trained on a collection of pages with manual labels of key phrases on a five-point scale. Given a set of pages, key phrases are manually selected from the pages and each key phrase is labeled with a score ranging from 1 to 5, for example. These key phrases and score are input to the regression model. After the regression model is trained, the regression model can predict scores for unseen key phrases. Of course, embodiments are not limited to a regression model.

The key phrase module 18 can apply the key phrase model disclosed herein on a corpus of documents or webpages that can include billions of documents or webpages, to produce a set of topic: score pairs for each document or page, e.g., $\{t_1: b_{r1}, t_2: b_{r2}, t_3: b_{r3}, \ldots\}$. The key phrase module 18 tags a document or page with topic t if the corresponding score $b_t$ is greater than a threshold. The key phrase module 18 can aggregate topics at site level to thereby create a site topic purity factor T(s,t) which is defined as follows:

Definition 2. $T(s,t) \in [0, 1]$ is the percentage of pages within the site s that are tagged with topic t. This topic purity factor T(s,t) is a component in later authority computation, as will be seen below, and can be used by the aggregation and ranking module 20.

The aggregation and ranking module 20 is a hybrid authority ranking model that can be used to compute topic-site-level authority scores. The hybrid authority ranking model takes site level PageRank topic features and other site features as inputs and produces site topical authority ranking.

Figure 2:
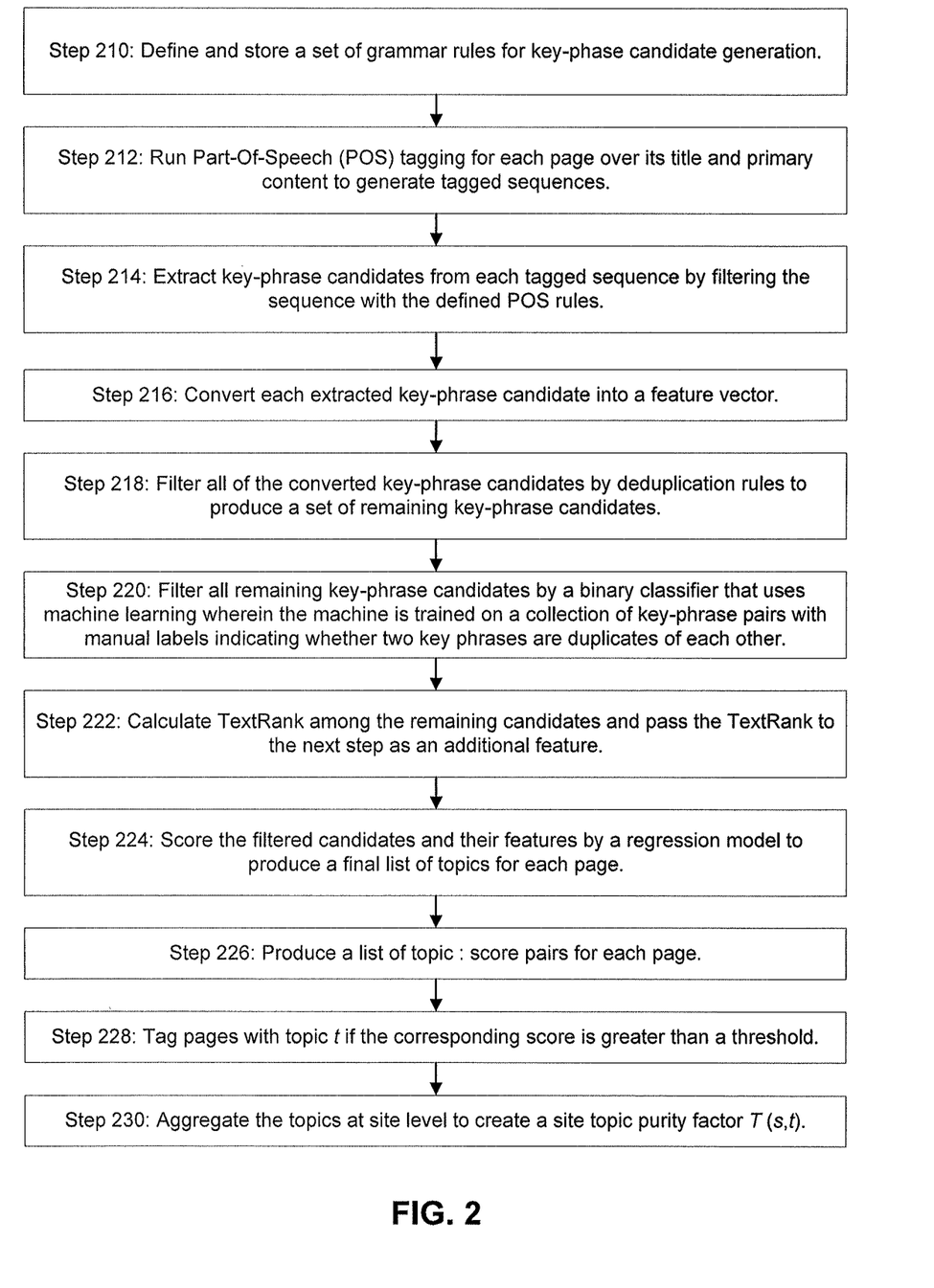
FIG. 2 shows an exemplary method for executing a key phrase module according to an embodiment of the present disclosure.
Figure 3:
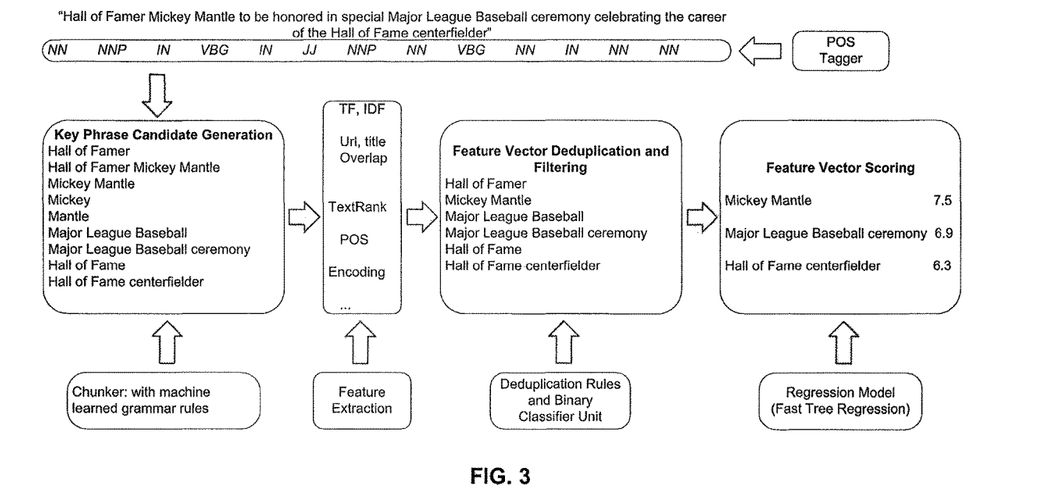
FIG. 3 shows an example of the method of FIG. 2

FIG. 2 shows an exemplary method 200 for executing the key phrase module 18. FIG. 3 shows an example of the method of FIG. 2.

In Step 210 of FIG. 2 a set of grammar rules for candidate generation are defined and/or stored in a grammar rules library 22, or are accessed from an external source. As noted above the grammar rules library 22 can be an external file or database, or in an alternative embodiment the set of grammar rules can be embedded in code within the key-phrase module 18. Step 210 can be performed by the chunker 26, an element that generates key-phrase candidates as described herein.

In Step 212 POS tagging is run by the POS tagger 24 for each page over its title and primary content, to generate tagged sequences. In Step 214 key-phrase candidates are extracted from each tagged sequence by the chunker 26, by filtering the sequence with the POS rules defined above. Then, in Step 216, each extracted key-phrase candidate is converted by a feature extractor 28 into a feature vector. Some of the more prominent features were discussed above.

In Step 218 all of the feature vectors are preferably filtered by deduplication rules. Then in Step 220 the feature vectors are filtered by a binary classifier. Steps 218 and 220 are performed by the deduplication rules and binary classifier unit 30.

In Step 222, TextRank is calculated among the remaining feature vectors by the deduplication rules and binary classifier unit 30 and passed to the next step as an additional feature. TextRank assigns a score to each feature vector, the score representing the relative importance of that particular feature vector in the input text, e.g., in the document or webpage. This score is used in the final scoring model.

In Step 224 the filtered feature vectors from Steps 218-222 are scored by a regression model using regression model unit 32, yielding a final list of topics for each page. As noted above one example of a suitable regression model is LambdaMart, a scoring model that is trained on a collection of pages with manual labels of key phrases on a five-point scale. Given a set of pages, key phrases are manually selected from the pages and each key phrase is labeled with a score ranging from 1 to 5, for example. These key phrases and score are input to the regression model. After the regression model is trained, the regression model can predict scores for unseen key phrases. Of course, embodiments are not limited to a regression model.

As noted above, applying the key phrase model of the key phrase on a corpus of documents or webpages produces in Step 226 a set of topic: score pairs for each page, e.g., {t$_1$: b$_{t1}$: b$_{t2}$, t$_3$: b$_{t3}$, . . . }. In Step 228 a page is tagged with topic t if the corresponding score b$_t$ is greater than a threshold. In Step 230 topics are aggregated at site level, creating a site topic purity factor T(s,t) which is defined as set forth in Definition 2 above, i.e., T(s, t)∈[0, 1] being the percentage of pages within the site s that are tagged with topic t.

This topic purity factor T(s, t) is a component in later authority computation and can be used by the aggregation and ranking module 20. Steps 226-230 are performed by the key phrase module 18.

As discussed above, the aggregation and ranking module 20 is a hybrid authority ranking model that is used to compute topic-site-level authority scores. This model takes site level PageRank topic features and other site features as inputs and produces site topical authority ranking.

Figure 4:
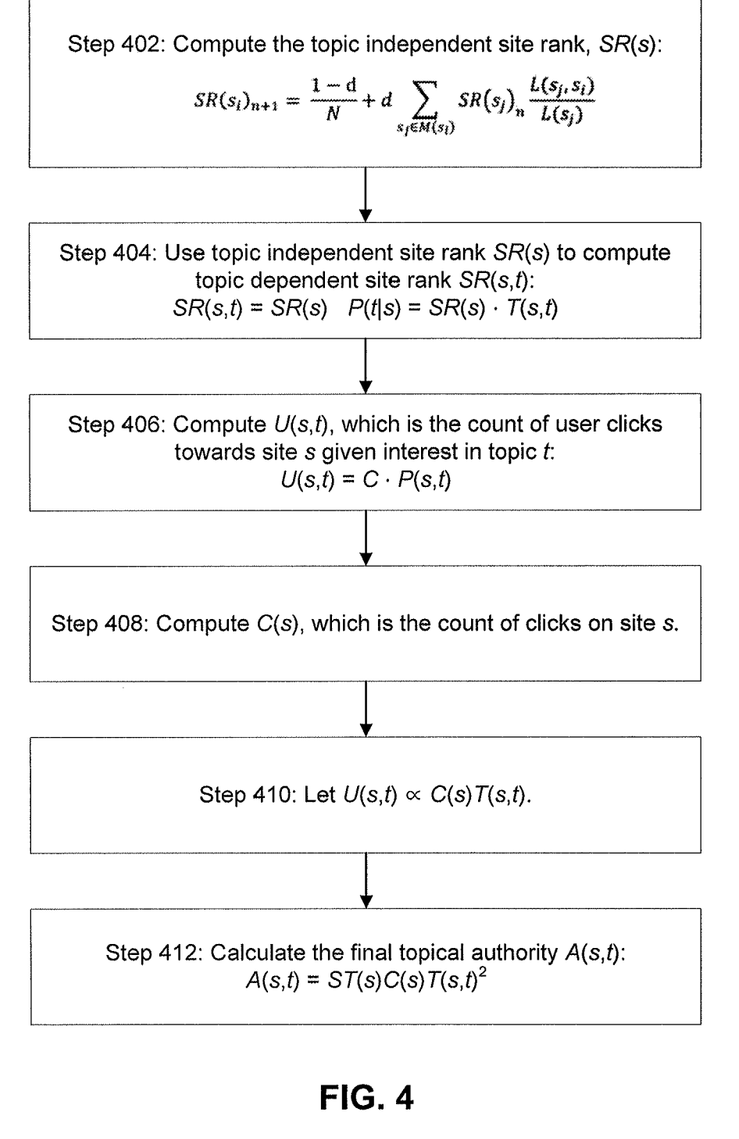
FIG. 4 shows an exemplary method for executing an aggregation and ranking module according to an embodiment of the present disclosure.

The aggregation and ranking module 20 is not restricted to small scale and relatively homogeneous domains; rather, the aggregation and ranking module 20 of embodiments is a topical authority solution that can be applied to the massive and heterogeneous internet across a great many extracted topics. FIG. 4 shows an exemplary method 400 for executing the aggregation and ranking module 20 according to an embodiment.

As an overall description of the method of FIG. 4, website authoritativeness A(s,t) is approximated as a function of popularity and site level topical purity as in Definition 3 below. The aggregation and ranking module 20 considers both the site's PageRank and the site's clicks as primary popularity signals. These two signals are susceptible to different types of spam attacks such as link farms and clickbait. Combining the two signals provides a more robust estimate of a site's popularity and quality. However, popularity and quality alone are not sufficient to reflect quality topical authoritativeness. For instance, a website for a search engine may be more popular than baseballhall.org as a site, but baseballhall.org is far more authoritative on the "baseball hall of fame" topic.

To overcome this drawback, the aggregation and ranking module 20 incorporates a topical dimension into the equation. Instead of merely accessing PageRank of a site s, or site rank SR(s), the aggregation and ranking module 20 measures site rank of a site on a topic SR(s,t). Similarly, for user clicks on a site U(s), the aggregation and ranking module 20 computes U(s,t), a metric that measures the count of user clicks towards a site s given that the user is interested in topic t. Topical authority is defined in Definition 3 by combining these two factors.

Definition 3. A(s,t)=Φ(SR(s,t), U(s,t)), where A(s,t) is website authoritativeness, SR(s,t) is a measure of site rank of a site on a topic, U(s,t) is a measure of user clicks towards a site s given that the user is interested in topic t, and Φ is the final combiner function which can be empirically tuned or machine learned.

The aggregation and ranking module 20 adapts PageRank to run on a graph where each node is a site, to compute a topic independent site rank. The intra-site links are dropped and links between sites are directed and weighted by the number of links from all pages in the source site pointing to the destination site. This site level graph allows the aggregation and ranking module 20 to compute in Step 402 the topic independent site rank, SR(s) as follows:

$$SR(s_i)_{n+1} = \frac{1-d}{N} + d \sum_{s_j \in M(s_i)} SR(s_j)_n \frac{L(s_j, s_i)}{L(s_j)} \quad (1)$$

In this equation, d is the damping factor and N is the number of sites in the graph. M(s$_i$) is the set of sites that link to L(s$_j$,s$_i$) is the count of links from pages in s$_j$ to pages in s$_i$ and L(s$_j$) denotes the count of total inter-site out-links from pages in s$_j$. Also, n is number of iterations in site rank propagation.

In Step 404 the topic dependent site rank SR(s,t) is calculated, using the topic independent site rank SR(s) from Equation (1). The topic dependent site rank SR(s,t) may perform best when it is defined as in Equation (2):

$$SR(s,t)=SR(s) \cdot P(t|s)=SR(s) \cdot T(s,t) \quad (2)$$

PageRank estimates the probability of a user visit onto a node via hyperlinks. P(t|s), in contrast, measures the probability of a user interested in topic t given that she visited a page on site s. Under Assumption A1, all webpages within the same site are equally likely to receive clicks. Using this assumption the aggregation and ranking module 20 can compute P(s|t)=T(s,t). It will be recalled that T(s,t), the topic purity factor, is the percentage of pages within the site s that are tagged with topic t. T(s,t) was defined above in Definition 2 as T(s,t)∈[0, 1], and was calculated by the key phrase module 18 in step 230 of FIG. 2.

The aggregation and ranking module 20 weights the final score with topic purity after site rank has converged. It is noted that Assumption A1 is not strictly true across the internet and therefore is not necessarily an ideal assumption. Nevertheless embodiments can overcome problems arising in tail topics, which are topics mentioned by relatively few pages on the internet.

In Step 406 U(s,t) is derived. As noted above, U(s,t) measures the count of user clicks towards a site s given that the user is interested in topic t. U(s,t)=C·P(s,t), where C denotes the total user click traffic on the internet and P(s,t) is the probability of users interested in topic t and clicked onto site s. Since C is a constant across all sites and topics, computing the ranking of U(s,t) essentially comes down to finding P(s,t):

$$\text{Let } U(s,t) \propto P(s,t)=P(s)P(t|s) \quad (3)$$

Here P(s) is the probability of a user click on site s, which is proportional to the count of clicks on site s. This click count is denoted as C(s), which is calculated in Step 408. One way to measure C(s) is to leverage Bing's anonymized traffic log to measure C(s) over an arbitrary period of time.

P(t|s) measures the probability of a click on a page tagged with topic t given that it occurred on site s. Under the same Assumption A1 (all webpages within the same site are equally likely to receive clicks), P(t|s) is equivalent to T(s,t).

$$\text{In Step 410 let } U(s,t) \propto C(s)T(s,t) \quad (4)$$

Equation (2) and Equation (4) together produce the final topical authority A(s,t) defined in Equation (6).

The combination function Φ dictates how the system leverages clicks, site rank, and topic purity signals to produce the final topical authority A(s,t):

$$A(s,t)=\Phi(SR(s)T(s,t),C(s)T(s,t)) \quad (5)$$

The baseline analytical model set out below in Eq. (6) and calculated in Step 412 is the product of the major topical authority factors. The factors are combined with equal importance and are therefore agnostic to the magnitude of their values during ranking:

$$A(s,t) = SR(s)C(s)T(s,t)^2 \quad (6)$$

There are other variations beyond the baseline. An improved analytical solution Eq. (7) can increase model accuracy. The method is to give a promotion to larger sites and to sites where the topic model is more confident that their pages are related to topic t.

$$A(s,t) = SR(s)C(s)T(s,t)^2 \cdot \log(\# \text{of pages in } s) \quad (7)$$
$\cdot \text{Avg}(b_t \text{ for pages tagged with t in } s)$ Returning now to FIG. 1, the output from the aggregation and ranking module 20 of the TAR platform 10, i.e., the final topical authority A(s,t), feeds in to the search engine server 70. As noted above, alternatively the key-phrase model and the aggregation and ranking model can be incorporated into a search engine server. These models can run on one or more computers depending on how big the corpus is, with a scheduler if desired to direct the machines how often to run the models. Embodiments can be incorporated into a search engine server via hardware or software or a combination thereof. With the input into the search engine server the search engine server can learn and use the input and train the input in producing its search results.

Example Implementations

The techniques disclosed herein are optimized for the machine learning environment on a computer network in contrast with previous computerized systems. The techniques disclosed herein with respect to the key phrase module 18 and the aggregation and ranking module 20 may be implemented for example as code of a search engine or as a software and/or hardware system that feeds a signal into a search engine for improving the functioning of a search engine and therefore its quality. Accordingly the techniques described herein are, in one aspect, integrated into the practical application of key phrase extraction. In another aspect the techniques described herein are integrated into the practical application of ordering and presenting quality and authoritative search results through a search engine including, but not limited to, a web search engine. Other practical applications are contemplated as well.

Figure 5:
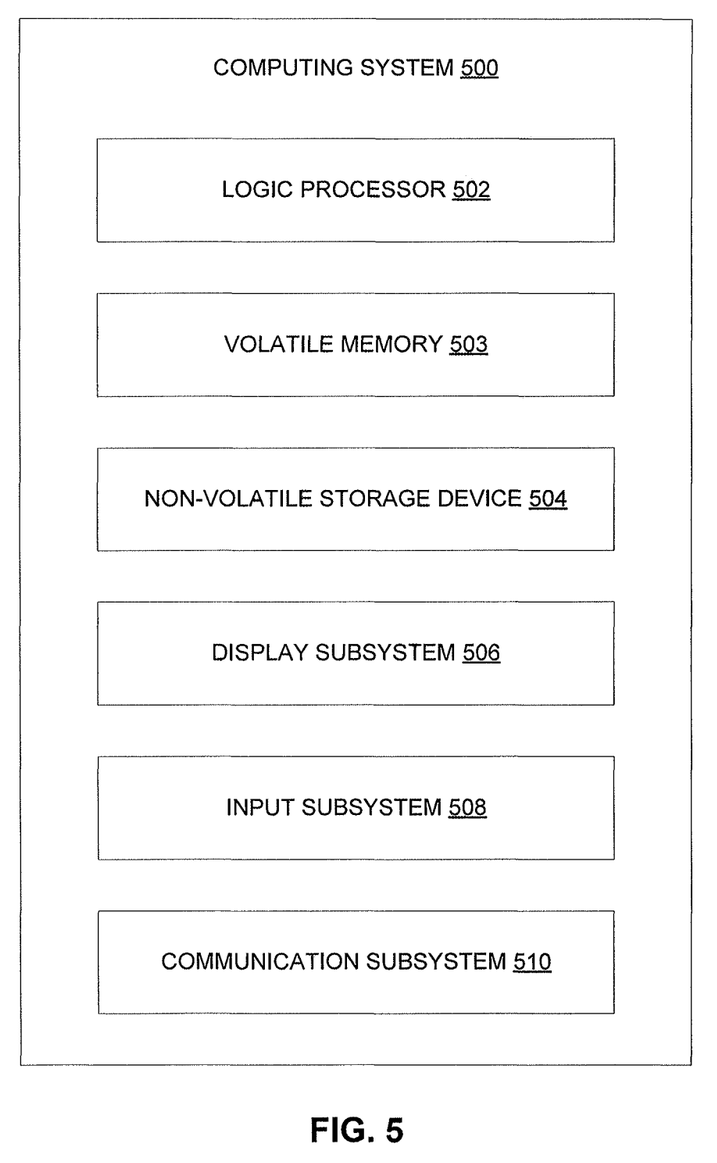
FIG. 5 shows an example computing system according to an embodiment of the present disclosure.

FIG. 5 schematically shows a non-limiting embodiment of a computing system 500 that can enact one or more of the methods and processes described above. Computing system 500 is shown in simplified form. Computing system 500 may embody one or more of the key phrase extraction module 18, the aggregation and ranking module 20, and the TAR platform 10, among other elements shown in the Figures and described herein. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 503, and a non-volatile storage device 504. Computing system 500 may optionally include a display subsystem 506, input subsystem 508, communication subsystem 510, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 504 includes one or more physical devices configured to hold instructions executable by the logic processors to implement the methods and processes described herein. When such methods and processes are implemented, the state of non-volatile storage device 504 may be transformed—e.g., to hold different data.

Non-volatile storage device 504 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 504 may include nonvolatile, dynamic, static, read/write, read-only, sequential-access, location-addressable, file-addressable, and/or content-addressable devices. It will be appreciated that non-volatile storage device 504 is configured to hold instructions even when power is cut to the non-volatile storage device 504.

Volatile memory 503 may include physical devices that include random access memory. Volatile memory 503 is typically utilized by logic processor 502 to temporarily store information during processing of software instructions. It will be appreciated that volatile memory 503 typically does not continue to store instructions when power is cut to the volatile memory 503.

Aspects of logic processor 502, volatile memory 503, and non-volatile storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "mechanism," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 504, using portions of volatile memory 503. It will be understood that different modules, programs, mechanisms and/or engines may be instantiated from the same application, service, code block, object, library, routine, API, function, etc. Likewise, the same module, program, mechanism and/or engine may be instantiated by different applications, services, code blocks, objects, routines, APIs, functions, etc. The terms "module," "program," "mechanism" and "engine" may encompass individual or groups of executable files, data files, libraries, drivers, scripts, database records, etc.

When included, display subsystem 506 may be used to present a visual representation of data held by non-volatile storage device 504. The visual representation may take the form of a graphical user interface (GUI). As the herein described methods and processes change the data held by the non-volatile storage device, and thus transform the state of the non-volatile storage device, the state of display subsystem 506 may likewise be transformed to visually represent changes in the underlying data. Display subsystem 506 may include one or more display devices utilizing virtually any type of technology. Such display devices may be combined with logic processor 502, volatile memory 503, and/or non-volatile storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 510 may be configured to communicatively couple various computing devices described herein with each other, and with other devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "includes," "has," "comprising," "including" and/or "having," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. This description has been presented for purposes of illustration and description, but is not intended to be exhaustive or limiting in the form disclosed. Many modifications and variations will be apparent to those of ordinary skill in the art without departing from the scope and spirit of the technology. The embodiment was chosen and described in order to best explain the principles of the technology and the practical application, and to enable others of ordinary skill in the art to understand the technology for various embodiments with various modifications as are suited to the particular use contemplated.

Although specific embodiments have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A system for including a webpage in a ranked list of webpages returned to a client computing device in response to receipt of a query, the system comprising:
a processor; and
memory storing instructions that, when executed by the processor, cause the processor to perform acts comprising:
receiving, on a search engine executing on the system, the query from the client computing device, wherein the client computing device is in network communication with the system;
returning the ranked list of webpages to the client computing device based upon the query, wherein the webpage belongs to a website, and further wherein a position of the webpage in the ranked list of webpages is based upon a topical authority score assigned to the website with respect to a topic, the topical authority score is representative of an authoritativeness of the website with respect to the topic, wherein the topical authority score for the website is computed by way of acts comprising:
extracting key phrase candidates from webpages that belong to the website;
converting the extracted key phrase candidates into feature vectors;
filtering the feature vectors to remove duplicates using a classifier that was trained on a set of key phrase pairs with manual labels indicating whether two key phrases are duplicates of each other, to produce remaining feature vectors for remaining key phrase candidates; and
assigning scores to the remaining key phrase candidates based upon the remaining feature vectors, wherein a key phrase candidate is the topic, and further wherein the topical authority score assigned to the website is based upon a score in the scores assigned to the key phrase candidate.

2. The system of claim 1, wherein the remaining key phrase candidates are topics, and further wherein topical authority scores assigned to the website are based upon the scores assigned to the remaining key phrase candidates, such that the web site has multiple topical authority scores assigned thereto for different topics.

3. The system of claim 1, wherein the classifier is a binary classifier.

4. The system of claim 1, wherein a regression model is employed to assign the scores to the remaining key phrase candidates.

5. The system of claim 1, wherein converting the extracted key-phrase candidates include at least one of the following features: language statistics, including Term Frequency (TF) and Inverted Document Frequency (IDF); a ratio of overlap with page title and page URL; relative position on the web page; one-hot encoding; features of surrounding words; case encoding; and stopword features.

6. The system of claim 1, the acts further comprising:
prior to filtering the feature vectors using the classifier, filtering the feature vectors using deduplication rules.

7. The system of claim 6, wherein the deduplication rules include at least one of: a first rule that combines candidates with different case; a second rule that combines candidates which are the same entity in full name and abbreviation; a third rule that deduplicates candidates that overlap with each other on language statistics; or a fourth rule that drops candidates starting or ending with stopwords or containing curse words.

8. The system of claim 1, wherein extracting the key phrase candidates from the webpages that belong to the website comprises using grammar rules to extract the key phrase candidates from the webpages, wherein the grammar rules are based upon queries previously submitted to the search engine.

9. The system of claim 8, wherein the grammar rules are based upon parts of speech assigned to terms in the queries.

10. The system of claim 8, wherein the grammar rules comprise a sequence of parts of speech, and further wherein extracting the key phrase candidates from the webpages that belong to the website comprises:
assigning parts of speech to terms in the webpages; and
extracting a sequence of terms in a webpage as a key phrase candidate due to the sequence of terms being assigned respective parts of speech that matches the sequence of parts of speech identified in the grammar rules.

11. A method performed by a computing system that executes a search engine, the method comprising:
receiving, at the search engine executing on the computing system, a query from a client computing device that is in network communication with the computing system;
returning a ranked list of webpages to the client computing device based upon the query, wherein the ranked list of webpages comprises a webpage that belongs to a website, and further wherein a position of the webpage in the ranked list of webpages is based upon a topical authority score assigned to the website with respect to a topic, the topical authority score is representative of an authoritativeness of the website with respect to the topic, wherein the topical authority score for the website is computed by way of acts comprising:
identifying key phrase candidates in webpages that belong to the website;
converting the identified key phrase candidates into feature vectors;
using a classifier that was trained on a set of key phrase pairs having labels indicating whether two key phrases are duplicates of one another, removing duplicate feature vectors to produce remaining feature vectors for remaining key phrase candidates; and
assigning scores to the remaining key phrase candidates based upon the remaining feature vectors, wherein a key phrase candidate in the remaining key phrase candidates is the topic, and further wherein the topical authority score assigned to the website is based upon a score in the scores assigned to the key phrase candidate.

12. The method of claim 11, wherein the remaining key phrase candidates are topics, and further wherein topical authority scores assigned to the website are based upon the scores assigned to the remaining key phrase candidates, such that the web site has multiple topical authority scores assigned thereto for different topics.

13. The method of claim 11, wherein the classifier is a binary classifier.

14. The method of claim 11, wherein a regression model is employed to assign the scores to the remaining key phrase candidates.

15. The method of claim 11, wherein converting the identified key-phrase candidates include at least one of the following features: language statistics, including Term Frequency (TF) and Inverted Document Frequency (IDF); a ratio of overlap with page title and page URL; relative position on the web page; one-hot encoding; features of surrounding words; case encoding; and stopword features.

16. The method of claim 11, further comprising:
prior to the duplicates being removed through use of the classifier, filtering the feature vectors using deduplication rules.

17. The method of claim 16, wherein the deduplication rules include at least one of: a first rule that combines candidates with different case; a second rule that combines candidates which are the same entity in full name and abbreviation; a third rule that deduplicates candidates that overlap with each other on language statistics; or a fourth rule that drops candidates starting or ending with stopwords or containing curse words.

18. A non-transitory computer-readable medium comprising instruction that, when executed by a processor, cause the processor to perform acts comprising:
receiving, at a search engine executing on a computing system, a query from a client computing device that is in network communication with the computing system;
returning a ranked list of webpages to the client computing device based upon the query, wherein the ranked list of webpages comprises a webpage that belongs to a website, and further wherein a position of the webpage in the ranked list of webpages is based upon a topical authority score assigned to the website with respect to a topic, the topical authority score is representative of an authoritativeness of the website with respect to the topic, wherein the topical authority score for the website is computed by way of acts comprising:
identifying key phrase candidates in webpages that belong to the website;
converting the identified key phrase candidates into feature vectors;
using a classifier that was trained on a set of key phrase pairs having labels indicating whether two key phrases are duplicates of one another, removing duplicate feature vectors to produce remaining feature vectors for remaining key phrase candidates; and
assigning scores to the remaining key phrase candidates based upon the remaining feature vectors, wherein a key phrase candidate in the remaining key phrase candidates is the topic, and further wherein the topical authority score assigned to the website is based upon a score in the scores assigned to the key phrase candidate.

19. The non-transitory computer-readable medium of claim 18, wherein the remaining key phrase candidates are topics, and further wherein topical authority scores assigned to the website are based upon the scores assigned to the remaining key phrase candidates, such that the website has multiple topical authority scores assigned thereto for different topics.

20. The non-transitory computer-readable medium of claim 18, wherein the classifier is a binary classifier.

\* \* \* \* \*